Patented Apr. 19, 1938

2,114,825

UNITED STATES PATENT OFFICE 2,114,825

PROCESS FOR PARTIAL DEHYDRATION OF ACETIC ACID AND OTHER LOWER FATTY ACIDS

Theodore O. Wentworth, Cincinnati, Ohio, assignor to The Vulcan Copper & Supply Co., Cincinnati, Ohio, a corporation of Ohio No Drawing. Application April 2, 1935, Serial No. 14,256

10 Claims. (Cl. 260—122)

This invention relates to a process for the concentration of aqueous solutions of acetic acid, the removal of water therefrom, and the production thereby of acetic acid partly, but not completely, dehydrated.

Various solvent materials have been proposed for extracting acetic acid from its aqueous solutions by counter-current liquid contact. The acetic acid after extraction may be more readily recovered from the solvent than from the water originally present. Still other methods have concerned themselves with the distillation of the aqueous solution in the presence of an auxiliary liquid, which, by reason of its insolubility in water and the vapor pressure relations dependent thereupon, brings over the water in a low boiling vaporous mixture, sometimes called an "azeotropic" mixture. In this process (see for example, Othmer U. S. Patent No. 1,917,391), it is usual practice to condense the vaporous mixture of water and withdrawing agent, separate the two layers of water and water insoluble third liquid respectively, discharge the water layer to waste (or to an auxiliary still for removing the trace of third liquid dissolved therein), and return the third liquid or withdrawing agent to the head of the column as reflux wash for the purpose of bringing over more water in a continuous operation.

I have found that a mixture of esters, particularly ethyl acetate and methyl acetate is a satisfactory material to use in the extracting operation and in the combined operation wherein, after systematic extraction of the aqueous acetic acid the water dissolved with the acetic acid in the solvent layer is removed in a so-called "azeotropic" distillation with the solvent itself.

The use of ethyl acetate, of ethyl ether and of isopropyl ether and various mixtures thereof is old in the extraction process for acetic acid recovery. After the extraction operation is finished, the extracting solvent is found to contain, besides the acetic acid, an amount of water which is unavoidably dissolved. This amount of water will vary with each extracting material employed; and with the strength of acid in the original feed, and hence in the saturated solvent.

I have found that in the use of ethyl acetate (one of the better materials) for this extraction operation, the amount of ester necessarily circulated to provide complete exhaustion of the aqueous phase is more than the amount required to form an azeotropic mixture with all of the water present in the solvent phase at the completion of the extraction.

Thus, in the removal of the solvent from the acid by distillation, all of the water is removed to give a totally dehydrated, dry, acid. This is not desirable in many operations, notably those in which a completely dehydrated acid is not required and those in which, for certain reasons, other purification or refining steps are best conducted before the last of the water is removed.

Other materials, such as methyl acetate, by reason of their low boiling point, and other physical factors do not form a constant boiling mixture with water which will bring over an important amount of water. Methyl acetate is, however, by reason of its considerable solubility in water, not suitable for use as an extracting agent by itself.

My invention consists in the use of a mixture of esters such as ethyl and methyl acetates, so chosen as to combine the comparative water insolubility of ethyl acetate with the lack of withdrawing power of methyl acetate to bring over water in the separation of solvent from more or less hydrous acid.

By properly balancing the ratios of the amounts of these two esters which are used as the extractant, I have found that it is possible to obtain an acid of any desired strength as a result of this distillation, without resorting to the dilution of the dry acid with water to bring it back to the desired strength. Such dilution would be possible, of course, but would involve the expense of an earlier complete dehydration.

I have also found it is advantageous to use mixtures of other esters, such as ethyl formate with ethyl acetate for acetic extraction, or of other esters with a common alcohol group, a common acid group, or with both groups different when other of the lower fatty acids are to be extracted from aqueous solutions and it is undesirable to remove all of the water present.

The use in practice of my invention will be made clear by the consideration of an example of its application to the recovery of acetic acid from dilute or pyroligneous liquors from wood distillation.

By means of a continuous counter-current liquid-liquid extractor of suitable design, two parts of solvent (consisting of 20–25% methyl acetate and of 75–80% ethyl acetate) are contacted with one part of dilute, 6% aqueous acetic acid. The water is discharged practically free of acid. The solvent layer, consisting of about thirty parts of the ester mixture, for every part of acetic acid, as well as a considerable quantity of water unavoidably dissolved in the extraction operation is submitted to distillation. From the top of the distillation column is removed the mixture of esters and most but not all of the water (the ester mixture withdrawing about 5-6% of its weight of water), and from the bottom is discharged a partly dehydrated acid containing about 5-6% water.

If an acid containing more than 5-6% water is desired, a correspondingly greater amount of methyl acetate is used in the solvent mixture, and, in the above example, if a mixture of about thirty parts of methyl acetate is used per one hundred parts of total solvent, the acid concentration resulting will contain approximately 20% water rather than 5-6%. In this way, any desired amount of water may be allowed to remain in the concentrated acid produced.

It will be understood by those skilled in the art, that many arrangements of standard equipment may be used to carry out the features of my invention, and will be within the spirit of my disclosure as limited and defined by the appended claims.

In particular, it may be noted that any standard type of extractor and distillation column which is efficient for this purpose may be used; that the discharged acid, still retaining some water, may be either one or a mixture of two or more of the lower fatty acids (formic, acetic, propionic, butyric, etc.); that the extracting solvents may be a mixture of any two or more of the many possible esters of these acids; that the operation of the rectification for separation of solvent mixture from acetic acid may be conducted with a dephlegmator condenser for returning to the column as reflux wash part of both water and solvent mixture vapors while passing to final condenser the balance of vapors, which are condensed, condensate passed to condenser, solvent layer divided into two or more streams, one of which enters the top of the distilling column and the rest of which enters the column at a lower point or points; and that the esters themselves may be added to the system for original charge or makeup, or the respective alcohols added at appropriate points to secure the ester desired by combination with the acid or acids being treated.

Having described my invention, what I claim and desire to secure by Letters Patent, is as follows:—

1. The process of controlled concentration of aqueous solutions of one or more of the lower fatty acids by extraction of one part of the solution with approximately two parts of two or more lower alkyl esters of said acids, one of said lower alkyl esters being methyl acetate in minor proportion relative to the other ester or esters and said methyl acetate being not less than 10 per cent. of the combined alkyl esters.

2. The process of concentrating aqueous solutions of one or more of the lower fatty acids by extraction with two or more lower alkyl esters of said acids, in the proportion of one part of the aqueous solution and two parts of the mixture of esters, said esters including methyl acetate 20-25%, a second ester or esters 75-80%, the solvent layer after extraction of the weak acid being subjected to distillation, said solvent layer containing a sufficient quantity of water to produce, on distillation, an acid containing 5-6% water.

3. A process in accordance with claim 2 in which the degree of concentration of the product desired is determined at the beginning of the operation, and such determination being an acid containing less than 5-6% of water the proportion of the methyl acetate in the mixture of lower fatty acid esters is decreased below 20% of said mixture but to not less than 10% thereof in order to obtain such higher concentration of the aqueous solution.

4. A process in accordance with claim 2 in which the degree of concentration of the product desired is determined at the beginning of the operation, and such determination being an acid containing more than 5-6% water, the proportion of the methyl acetate in the mixture of lower fatty acid esters is increased about 25% of said mixture but not above 45% thereof in order to obtain such lower concentration of the aqueous solution.

5. A process of concentrating aqueous acetic acid to obtain concentration with approximately 5-6% water by distillation in the presence of two parts of a mixture of lower alkyl esters of lower fatty acids including methyl acetate, the proportion of the latter to the other esters being approximately 20-25%, the esters co-acting as withdrawing agents for the water.

6. The process of dehydrating an aqueous aliphatic acid which comprises incorporating therewith a dehydrating agent consisting of ethyl acetate and methyl acetate and distilling water and agent from the mixture.

7. The process of partially dehydrating aqueous pyroligneous acid which comprises extracting the aqueous acid with a solvent consisting of ethyl acetate and methyl acetate, recovering the solvent layer and distilling water and solvent therefrom.

8. The process of partially concentrating aqueous aliphatic acids which comprises extracting the aqueous acids with a solvent comprising ethyl acetate and methyl acetate, the methyl acetate content being sufficient to yield a solvent layer which has more than enough water relative to the amount of ethyl acetate-methyl acetate to insure its removal as an azeotrope, separating the solvent layer and distilling an azeotrope of ethyl acetate-methyl acetate and water from the separated solvent layer.

9. An extracting agent for use in concentrating dilute aliphatic acids comprising about 20-30% methyl acetate and the balance mainly ethyl acetate.

10. In the process of concentrating aqueous acetic acid, the use in an azeotropic mixture of two or more lower alkyl esters of lower fatty acids, said mixture including methyl acetate in minor proportion but not less than 10 per cent. of the mixture of esters.

THEODORE O. WENTWORTH.